United States Patent
Shioyama et al.

[11] Patent Number: 5,711,734
[45] Date of Patent: Jan. 27, 1998

[54] POWER TRANSMISSION BELT

[75] Inventors: Tsutomu Shioyama; Katsuya Yamaguchi, both of Kobe, Japan

[73] Assignee: Bando Chemical Industries, Ltd., Kobe, Japan

[21] Appl. No.: 753,499

[22] Filed: Nov. 26, 1996

[30] Foreign Application Priority Data

Nov. 27, 1995 [JP] Japan .................................. 7-307439

[51] Int. Cl.$^6$ .................................................. F16G 1/08
[52] U.S. Cl. ........................ 474/260; 474/264; 474/271
[58] Field of Search .................................. 474/237, 260, 474/264, 266, 268, 271

[56] References Cited

U.S. PATENT DOCUMENTS

| | | | |
|---|---|---|---|
| 5,120,280 | 6/1992 | Mizuno et al. | 474/263 X |
| 5,178,586 | 1/1993 | Mizuno | 474/268 X |
| 5,230,667 | 7/1993 | Nakajima et al. | 474/263 |
| 5,378,206 | 1/1995 | Mizuno et al. | 474/263 |
| 5,484,322 | 1/1996 | Nagai et al. | 474/260 X |
| 5,501,908 | 3/1996 | Shioyama et al. | 474/263 X |
| 5,545,097 | 8/1996 | Kitazumi et al. | 474/266 |
| 5,610,217 | 3/1997 | Yarnell et al. | 474/271 X |

FOREIGN PATENT DOCUMENTS 63-57654 3/1988 Japan.
4-211748 8/1992 Japan.

*Primary Examiner*—Roger J. Schoeppel
*Attorney, Agent, or Firm*—Sixbey Friedman Leedom & Ferguson; Gerald J. Ferguson, Jr.; Thomas W. Cole

[57] ABSTRACT

A compression rubber layer of a V-belt is made of an alkylated chlorosulfonated polyethylene composition in which a value of tan δ is 0.08 to 0.15 under conditions of a temperature of 100° C. and a frequency of 10 Hz. Thus, production of a crack during the running of the belt is restricted. The alkylated chlorosulfonated polyethylene composition is composed of 0.6 to 1.2 weight % sulfur-contained alkylated chlorosulfonated polyethylene of 100 weight parts, N,N'-m-phenylene dimaleimide of 0.2 to 5.0 weight parts, dipentamethylene thiuram tetrasulfide of 0.1 to 4.0 weight parts and pentaerythrite of 0.1 to 5.0 weight parts.

8 Claims, 3 Drawing Sheets

POWER TRANSMISSION BELT

BACKGROUND OF THE INVENTION

This invention relates to a power transmission belt and particularly relates to improvements in running life of a frictional forced power transmission belt such as a V-ribbed belt and a V-belt.

Recent automobile engines have been increased in engine room temperature as compared with conventional automobile engines. This increases the demand for an improved heat resistance of a power transmission belt used in an automobile. For such a power transmission belt, it is examined to use, as its rubber material, a chlorosulfonated polyethylene rubber having an excellent heat resistance. However, such kind of a rubber material has disadvantages in its durability and low temperature characteristics (low temperature resistance). Therefore, improvements of these disadvantages are expected.

Meanwhile, Japanese Patent Application Laid-Open Gazette No. 4-211748 discloses a technique that uses, as a compression rubber of a power transmission belt, alkylated chlorosulfonated polyethylene (ACSM) in which alkyl groups are introduced onto the main chain linear backbone of a chlorosulfonated polyethylene molecule so as to suppress the crystallization of chlorosulfonated polyethylene. More specifically, the ACSM is prepared so that its chlorine content is 15 to 35 weight % and its sulfur content is 0.5 to 2.5 weight %, thereby improving low temperature characteristics of the power transmission belt.

Further, Japanese Patent Application Laid-Open Gazette No. 63-57654 discloses a power transmission belt including a rubber material in which dimaleimide, nickel dithiocarbamate and thiuram polysulfide are added to a chlorosulfonated polyethylene compound to improve the proof against compression set.

In the power transmission belt using the ACSM, however, when its period of running (period of use) becomes long, the belt produces cracks due to repeated mechanical impacts. Cracks frequently occur at a compression rubber layer of the belt. In particular, in the case that a pulley around which the power transmission belt is wound has a small diameter, a bending deformation of the belt when the belt passes the pulley is large so that production of cracks becomes heavy.

The aforementioned Japanese Patent Application Laid-Open Gazette No. 4-211748 is the technique of using the ACSM as a rubber material for power transmission belt thereby preventing rubber from stiffening due to flocculation of chlorine at the time of a low temperature of −30° C., but is not a countermeasure against production of cracks due to repeated mechanical impacts.

An object of the present invention is to increase a running life of a power transmission belt by dealing with production of cracks when ACSM is used as a rubber material for power transmission belt.

SUMMARY OF THE INVENTION

To attain the above object, the inventors has repeated pre-production of a power transmission belt and tests for the pre-produced belts and has found that when various kinds of power transmission belts are produced in such a way as to change a value of tan δ as an index of a dynamic viscosity-elasticity characteristic of a polymer, the running life of the belt largely varies depending on the value of tan δ. Based on this finding, the inventors has completed the present invention. Below, the present invention will be described in detail.

An aspect of the invention is characterized in that at least one of elements of a power transmission belt is made of an ACSM composition in which a value of tan δ (loss tangent) under conditions of a temperature of 100° C. and a frequency of 10 Hz is 0.08 to 0.15. Thus, the element can be restricted from producing a crack thereby increasing the belt life.

In another aspect of the invention, the above-mentioned power transmission belt is characterized in that a sulfur content of alkylated chlorosulfonated polyethylene as a main ingredient of the ACSM composition is 0.6 to 1.2 weight %. This provides an advantage in accomplishing the desired value of tan δ.

The ACSM composition is a low-density polyethylene composition having a chlorosulfonated linear molecular structure and in the present invention, the value of tan δ of the ACSM composition is 0.08 or more. Accordingly, even if the element of the power transmission belt repeatedly undergoes external mechanical impacts, mechanical energy of the impacts is dispersed so as to be prevented from being stored in the element. In other words, stress concentration causing production and development of a crack of the belt can be suppressed.

(tan δ)

The above-mentioned tan δ will be described below in detail. According to the test for dynamic properties of vulcanized rubbers (JIS K 6394), a complex modulus is expressed by the following formula (1):

$$G^* = G' + iG'' \tag{1}$$

wherein $G^*$ indicates a complex shear modulus, $G'$ indicates a storage modulus (the real part of a complex shear modulus), and $G''$ indicates a loss modulus (the imaginary part of a complex shear modulus).

An angle δ showing a time delay between an applied stress and a strain is referred to as a dispersion ratio and is defined by the following formula (2):

$$\tan \delta = G''/G' \tag{2}$$

"tan δ" is an attenuation term and shows a ratio of energy dispersed in the form of heat to maximum energy stored in the form of heat during one cycle of vibration. The loss modulus $G''$ is proportional to heat dispersed per vibration cycle as shown in the following formula (3):

$$H = \pi G'' \gamma^2 \tag{3}$$

wherein H indicates heat dispersed per vibration cycle and γ indicates a maximum value of shear strain.

Thus, tan δ means the ease of dispersion in the form of heat of mechanical energy applied to a rubber composition, in other words, the difficulty of storage of the energy. In the present invention, attention is focused on the storage of energy, so that the tan δ is set at the above-mentioned range of large values.

The reason for setting the value of tan δ under conditions of a temperature of 100° C. and a frequency of 10 Hz in this invention is that a consideration is given to situations and conditions in which a common power transmission belt (such as a timing belt for automobile) is used and in particular, with regard to the frequency, a consideration is given to a cycle in which a portion of the power transmission belt is bent and stretched by passing a pulley.

As is evident from the above definition of tan δ, the value of tan δ of 0.08 or more in this invention means that even if a power transmission belt is repeatedly bent around a pulley, only a small amount of kinetic energy is stored in the belt. Thus, stress concentration can be suppressed thereby providing an advantage in preventing production of a crack. In view of this, more preferably, the lower limit value of tan δ is 0.09.

(Upper Limit Value of tan δ)

The reason for setting the upper limit value of tan δ at 0.15 in this invention is that if the value of tan δ is over 0.15, a subject rubber portion of a belt readily becomes limp. In detail, when the value of tan δ is increased, though this provides an advantage in preventing production of a crack, an amount of heat converted from energy externally applied to the belt is also increased. Thereby, an amount of heat generated at the rubber portion of the belt is increased so that the rubber portion becomes limp. In view of this, more preferably, the upper limit value of tan δ is 0.13.

(Sulfur Content and Chlorine Content)

The sulfur content has a close relationship with an amount of chlorosulfone group included in a molecule, that is, the number of cross-linking points. As the sulfur content is increased, the cross-linking structure becomes closer. Thus, the sulfur content is an important factor for changing the value of tan δ of the ACSM composition.

The reason for setting the upper limit value of the sulfur content at 1.2 weight % in the above aspect of this invention is that if the sulfur content is over 1.2 weight %, this makes the value of tan δ excessively small and makes it difficult to set tan δ at the above-mentioned large values. The upper limit value of the sulfur content is preferably 1.0 weight % and further preferably 0.8 weight %. The reason for setting the lower limit value of the sulfur content at 0.6 weight % is that if the sulfur content is below 0.6 weight %, this makes it difficult to formulate other compounding ingredients though there is an advantage in setting tan δ at the large values.

Though the value of tan δ varies depending on the sulfur content as mentioned above, the chlorine content can also cause variations of the value of tan δ. However, the chlorine content has a closer relationship with the crystallization of ACSM. As the chlorine content is increased, the low-temperature characteristics become poorer while the elasticity thereof becomes higher. Accordingly, it is suitable to set the chlorine content at 15 to 35 weight %, more preferably, 25 to 32 weight %. In detail, when the upper limit value of the chlorine content is set at 35 weight %, more preferably, 32 weight %, flocculation energy of chlorine can be restricted to a small amount thereby providing an advantage in preventing the rubber from stiffening. This improves the low temperature resistance of the belt. On the other hand, when the lower limit value of the chlorine content is set at 15 weight %, more preferably, 25 weight %, this provides advantages in securing the oil resistance and the mechanical strength of the rubber.

However, an attention must be paid to the fact that though a sulfur content and a chlorine content of ACSM used in a power transmission belt is also disclosed in the aforementioned Japanese Patent Application Laid-Open Gazette No. 4-211748, a value of tan δ cannot be specified only by a sulfur content and a chlorine content of ACSM.

A value of tan δ varies depending on not only a sulfur content and a chlorine content of ACSM but also the type and quantity of other compounding ingredients such as a vulcanizing agent.

For example, when both compounding amounts of a vulcanizing agent and a vulcanization accelerator are reduced, tan δ can be set at the specific large values. Even when a compounding amount of carbon black or a compounding amount of process oil is increased, tan δ can be set at the large values. However, when compounding amounts of these compounding ingredients are changed, other physical properties of the belt rubber are correspondingly changed. Therefore, it is necessary to adjust respective amounts of the compounding ingredients in consideration of physical properties of various kinds of rubbers used in the belt.

(Vulcanizing Agent and Vulcanization Accelerator)

In still another aspect of the present invention, the power transmission belt using the above ACSM composition as at least one of elements of the belt is characterized in that the ACSM composition is composed of alkylated chlorosulfonated polyethylene of 100 weight parts, N,N'-m-phenylene dimaleimide of 0.2 to 5.0 weight parts, dipentamethylene thiuram tetrasulfide of 0.1 to 4.0 weight parts and pentaerythrite (pentaerythritol) of 0.1 to 5.0 weight parts. Thereby, the element made of the ACSM composition can be prevented from becoming limp and producing a crack.

The N,N'-m-phenylene dimaleimide acts as a vulcanizing agent. When a compounding amount of N,N'-m-phenylene dimaleimide is below 0.2 weight parts, the rubber becomes undercure. On the other hand, when the compounding amount is over 5 weight parts, this makes it difficult to set tan δ at the above-mentioned large values thereby providing a disadvantage in preventing production of a crack. In view of this, a compounding amount of N,N'-m-phenylene dimaleimide is more preferably within the range of 1 to 3 weight parts.

The dipentamethylene thiuram tetrasulfide serves as a vulcanization accelerator, which is used together with the N,N'-m-phenylene dimaleimide thereby accelerating cross-linking. When a compounding amount of dipentamethylene thiuram tetrasulfide is below 0.1 weight part, an expected acceleration effect cannot be obtained. On the other hand, when the compounding amount is over 4 weight parts, tan δ has a considerably small value. Therefore, the compounding amount of this vulcanization accelerator is set within the above-mentioned range and is more preferably set within the range of 1 to 2 weight parts.

Though detailed functions of pentaerythrite are not known, it is considered that the pentaerythrite accelerates the cross-linking of ACSM while optimizing the cross-linking state, thereby improving the flex fatigue resistance of ACSM.

The ACSM can be formed in various kinds of cross-linking structures. N,N'-m-phenylene dimaleimide of the ACSM has a maleimide cross-linking structure and dipentamethylene thiuram tetrasulfide has a sulfur cross-linking structure. In the case of using a metallic oxide (magnesium oxide) as shown in the below-mentioned embodiment of this invention, the ACSM can have a metallic oxide cross-linking structure. That is, when such a plurality of vulcanizing agents or vulcanization accelerators are used together in the ACSM, there exist plural kinds of cross-linking structures in the ACSM.

Meanwhile, whether pentaerithrite is mixed into the ACSM or not has an effect on the ratio of the above-mentioned cross-linking structures so that the physical properties of the rubber are largely changed. In particular, the ratio of ingredients of the rubber composition as shown in this invention can largely improve the flex fatigue resistance of the rubber.

When a compounding amount of pentaerithrite is below 0.1 weight part, expected good effects cannot be obtained. On the other hand, when the compounding amount is over 5 weight parts, cross-linking is excessively accelerated so that a suitable flex fatigue resistance of the belt cannot be obtained. Therefore, the compounding amount of pentaerithrite is set within the above-mentioned range and more preferably, within the range of 1 to 4 weight parts.

As mentioned so far, since the respective compounding amounts of the vulcanizing agent and the vulcanization accelerator are set within the above respective ranges in which tan δ can be set at the large values while necessary vulcanization is secured, this prevents production of a crack in the belt without interfering with the running stability of the belt, thereby increasing the running life of the belt.

(Other Compounding Ingredients)

As mentioned above in relation to the description about tan δ, the ACSM composition can be prepared in a way of optionally selecting one or plurality of common rubber compounding ingredients such as a reinforcer (e.g., carbon black), a filler, an acid acceptor, a plasticizer, a tackifier, a processing aid, an antioxidant and an activator. MAF, FEF, GPF, SRF or the like may be used as carbon black. Magnesium oxide, calcium hydroxide, a magnesium oxide-aluminum oxide solid solution or the like may be used as an acid acceptor. Process oil, dioctyl adipate (DOA), dioctyl sebacate (DOS) or the like may be used as a softener. Polyether plasticizer or the like may be used as a plasticizer. Cumarone resin, phenol resin, alkylphenol resin or the like may be used as a tackifier. Nickel dibutyl dithiocarbamate (NBC), 2,2,4-trimethyl-1,2-dihydroquinoline condensate (TMDQ), 6-ethoxy-2,2,4-trimethyl-1,2-dihydroquinoline condensate (ETMDQ) or the like may be used as an antioxidant.

In the case of using a magnesium oxide-aluminum oxide solid solution as an acid acceptor, its compounding amount is 1 to 50 weight parts, preferably 4 to 20 weight parts, with respect to the ACSM of 100 weight parts. When a compounding amount of the magnesium oxide-aluminum oxide solid solution is below 1 weight part, hydrogen chloride generated during cross-linking cannot be sufficiently removed. As a result, the cross-linking points of the ACSM are decreased so that a desired vulcanized product cannot be obtained. The resultant belt is lacking in heat resistance and has a crack at an early stage. On the other hand, when the compounding amount is over 50 weight parts, the Mooney viscosity becomes considerably high so that a problem on finishing occurs.

The ACSM and other compounding ingredients can be kneaded with each other by using known means such as a Banbury mixer and a kneader and known methods.

In still another aspect of the present invention, a power transmission belt comprising an adhesion rubber layer which holds a cord extending in a longitudinal direction of the belt at a suitable position and a compression rubber layer is characterized in that at least a part of the compression rubber layer is formed of the above-mentioned ACSM composition. Thus, the compression rubber layer is kept from producing a crack thereby increasing the belt life.

In other words, this aspect of the invention is characterized in that the ACSM composition in which tan δ is set within the above-mentioned specific range is applied to a compression rubber layer as an element of the belt.

In detail, when a portion of the compression rubber layer of the power transmission belt is engaged with a pulley, it is bent into a compressed state. Thereafter, when the portion passes away from the pulley, it is returned from the compressed state to a stretched state. Thus, the compression rubber layer is repeatedly subjected to the deformation of stretch and compression. However, since tan δ of the compression rubber layer is set within the range of the specific large values, the compression rubber layer is kept from producing a crack thereby increasing the belt life.

In this aspect of the invention, the entire compression rubber layer may be formed of the ACSM composition. When a part of the compression rubber layer is formed of the ACSM composition, the compression rubber layer may be composed of two layers of the ACSM composition and another rubber material, may be composed of multi-layers in which the ACSM composition and another rubber material are alternately layered, may be so composed that the ACSM composition and another rubber material are dispersed in such a manner as to form one into a sea and the other into an island, or may be so composed that the ACSM composition and another rubber material are uniformly mixed.

The cord may be a high-strength, low-elongation cord made of polyester fibers, aramid fibers, glass fibers or the like.

The adhesion rubber layer may be made of a chloroprene rubber composition, a hydrogenated nitrile rubber composition having a hydrogen addition ratio of 80% or more, an ACSM composition, a CSM composition or the like, which each have a heat resistance and a good adhesive property to polyester fibers, aramid fibers, glass fibers or the like forming a cord.

The cord may be subjected to adhesive treatment in order to improve the adhesive property to the adhesion rubber. Such adhesive treatment is generally conducted so that fibers are soaked into resorcinol-formaldehyde latex (RFL liquid) and are then heat-dried thereby uniformly forming an adhesion layer on the cord surface.

In still another aspect of the present invention, the power transmission belt in which the compression rubber layer is formed of the above-mentioned ACSM composition is characterized in that short fibers are mixed into the ACSM composition forming the compression rubber layer. Thus, the power transmission belt can be restricted from becoming limp thereby increasing the belt life.

With respect to the rubber material like the above compression rubber layer, i.e., the ACSM composition including short fibers, it is known that if the short fibers are oriented in a fixed direction, the rubber material has a large difference in dynamic property (mechanical property) between the fiber orientation and a direction perpendicular to the fiber orientation. In the case that short fibers are mixed into a compression rubber layer of a frictional forced power transmission belt, the short fibers are generally oriented in a direction perpendicular to the frictional surface of the belt with which a pulley comes into contact.

For the above-mentioned short fibers, organic fibers such as polyester fibers, nylon fibers, aramid fibers or the like or inorganic fibers may be used. In particular, short fibers having the following shape and physical properties are suitably used:

| | |
|---|---|
| Sectional area; | $0.15 \times 10^{-6}$ cm$^2$ to $100 \times 10^{-6}$ cm$^2$ |
| Length; | 0.10 mm to 20 mm |
| Aspect ratio; | 10 to 2000 |
| Tensile modulus of elasticity; | 200 kg/mm$^2$ or more |

Further preferable shape and physical properties of short fibers are as follows:

| | |
|---|---|
| Sectional area; | $0.50 \times 10^{-6}$ cm$^2$ to $20 \times 10^{-6}$ cm$^2$ |
| Length; | 1.0 mm to 5.0 mm |

| | |
|---|---|
| Aspect ratio; | 50 to 1000 |
| Tensile modulus of elasticity; | 1000 kg/mm² to 100000 kg/mm² |

In still another aspect of the present invention, the above-mentioned power transmission belt is a raw edge V-belt. In still another aspect of the present invention, the power transmission belt is a raw edge V-ribbed belt.

Conventional raw edge type power transmission belts each have a problem that its compression rubber layer produces a crack. The present invention provides an advantage in solving such a problem.

Further, a power transmission belt of the present invention is not limited to raw edge type power transmission belts as in the below-mentioned embodiments, that is, may be other types of power transmission belts such as a flat belt. Furthermore, a power transmission belt of the present invention may be a wrapped type belt in which the entire surface of the belt is covered with a rubberized fabric.

Furthermore, in a power transmission belt of the present invention, an element to be made of the ACSM composition having the above-mentioned value of tan δ is not limited to the compression rubber layer. In other words, other elements such as an adhesion rubber layer and a backing rubber layer disposed at the outside of the adhesion rubber layer may be made of the above-mentioned ACSM composition.

DESCRIPTION OF THE PREFERRED EMBODIMENTS (Preferred Embodiments about Belt Structure)

Figure 1:
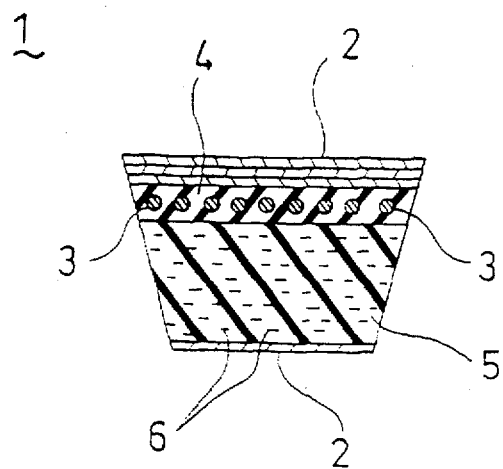
FIG. 1 shows a cross section of a V-belt according to an embodiment of the present invention.

FIG. 1 shows a V-belt 1 as an embodiment of a power transmission belt of this invention. The V-belt 1 is composed of: three rubberized fabrics 2 located at the top surface of the belt; an adhesion rubber layer 4 in which a high-strength, low-elongation cord 3 is arranged; a compression rubber layer 5 as an elastic body layer; and a rubberized fabric 2 located at the bottom surface of the belt. The rubberized fabrics 2 at the belt top surface, the adhesion rubber layer 4, the compression rubber layer 5 and the rubberized fabric 2 at the belt bottom surface are vertically layered to form the v-belt 1. Further, the V-belt 1 is a raw edge type one in which side surfaces of those above layered members are exposed. Into the compression rubber layer 5, short fibers 6 are mixed so as to be oriented along a belt width direction.

Figure 2:
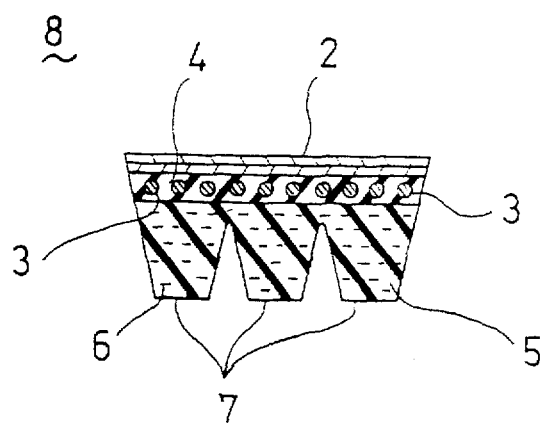
FIG. 2 shows a cross section of a V-ribbed belt according to another embodiment of the present invention.

FIG. 2 shows a V-ribbed belt 8 as another embodiment of a power transmission belt of this invention. The V-ribbed belt 8 is composed of: two rubberized fabrics 2 located at the top surface of the belt; an adhesion rubber layer 4 in which a high-strength, low-elongation cord 3 is arranged; and a compression rubber layer 5 as an elastic body layer. The rubberized fabrics 2, the adhesion rubber layer 4 and the compression rubber layer 5 are vertically layered to form the V-ribbed belt 8. Further, the V-ribbed belt 8 is a raw edge type one in which side surfaces of those above layered members are exposed. The compression rubber layer 5 has a plurality of ribs 7, and short fibers 6 are mixed into the compression rubber layer 5 so as to be oriented along a belt width direction.

(Effects that Sulfur Content of ACSM and Amount of Compounding Ingredient have on tan δ and Belt Life)

Measurement of tan δ

Some types of ACSM different in sulfur content from each other were prepared, various kinds of ACSM compositions having different formulations were made by using those different types of ACSM and test pieces without short fiber were made from the ACSM compositions respectively. Then, the respective values of tan δ of the test pieces were measured under conditions of a test piece temperature of 100° and a frequency of 10 Hz based on the regulation of JIS K 6394.

More specifically, four types of ACSM having sulfur contents of 0.6%, 0.7%, 0.8% and 1.0% respectively were prepared. With respect to the compounding ingredients, an amount of a vulcanizing agent "VULNOC PM" (trade name of N,N'-m-phenylene dimaleimide produced by Ouchi Shinko Kagaku-Kogyo Kabushiki-Kaisha in Japan) was changed within the range of 0.2 to 6 weight parts, an amount of a vulcanization accelerator "NOCCELER TRA" (trade name of dipentamethylene thiuram tetrasulfide produced by Ouchi Shinko Kagaku-Kogyo Kabushiki-Kaisha) was changed within the range of 0 to 5 weight parts, and an amount of pentaerithrite was changed within the range of 0 to 6 weight parts. In preparation of the test pieces, the rubber material was kneaded by a Banbury mixer. The vulcanization of the rubber material was conducted under the condition generally regarded as a desirable condition (160° C.×40 minutes).

Measurement of Belt Running Life

Short fibers were mixed into the ACSM compositions having the same formulations as in the above test pieces so as to be oriented along a fixed direction thereby forming different types of rubber materials. Next, V-belts were produced in such a way as to form their compression rubber layers from the different types of rubber materials, respectively. Then, respective running lives of the V-belts were measured. Those sample V-belts were raw edge type ones shown in FIG. 1. With respect to short fibers, aramid short fibers having 2 denier and 3 mm fiber length were used and its amount of mixture was 15 weight parts per 100 parts ACSM. The short fibers were mixed into the ACSM composition by an open roller.

The cords of the sample belts were made of polyester fibers. The cord was impregnated with an adhesive liquid in which an isocyanate compound was dissolved in a solvent, was heat-dried, was soaked in an RFL liquid and was then heat-dried. The RFL liquid was a mixture of an RF liquid (resorcinol-formaldehyde liquid) of 430.5 weight parts, 2,3-dichlorobutadiene of 787.4 weight parts, water of 716.4 weight parts and a wetting agent (2% sodium dioctyl sulfosuccinate) of 65.8 weight parts. For the rubber material forming the adhesion rubber layer of each sample belt, an ACSM composition composed of ACSM of 100 weight parts, carbon black of 40 weight parts, an antioxidant of 2 weight parts, a vulcanization accelerator of 2 weight parts, a MgO-Al₂O₃ solid solution of 8 weight parts and N-N'-m-phenylene dimaleimide of 1 weight part was used.

The above structures of the sample belts are no more than examples and therefore a power transmission belt of the present invention is not limited to the sample belts having the above structures.

Figure 3:
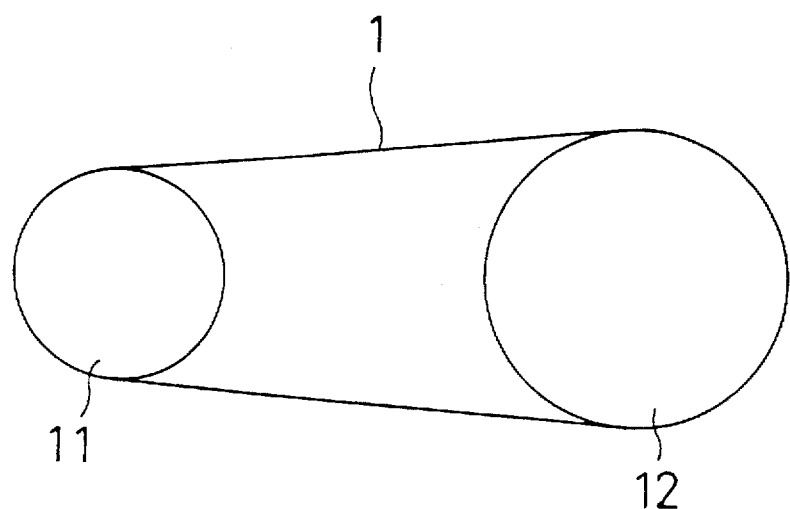
FIG. 3 is a front view schematically showing a manner of a running life test for power transmission belt.

As shown in FIG. 3, the running life test was conducted in such a manner that each sample V-belt i was wound between a driving pulley 11 and a driven pulley 12 and was run under the below-mentioned conditions. Then, the time period (hr) until each sample V-belt 1 produced a crack in the compression rubber layer or became limp to fall into a defective power transmission was measured.

| Conditions of Belt Running Test | |
|---|---|
| Diameter of Driving Pulley; | 65 mm |
| Diameter of Driven Pulley; | 80 mm |
| Initial Tension; | 15 kgf |
| Ambient Temperature; | 95 ± 5° C. |
| Belt Speed; | 30 m/sec |
| Load; | 5 PS |

The test results are shown in Table 1a to 1d together with the respective formulations of the samples. In the tables, values of ingredients are each indicated by a compounding amount (weight part).

TABLE 1a

| | Embodiment | | | | | |
|---|---|---|---|---|---|---|
| | 1 | 2 | 3 | 4 | 5 | 6 |
| ACSM(S = 0.6) | | | | 100 | | |
| ACSM(S = 0.7) | | | 100 | | 100 | 100 |
| ACSM(S = 0.8) | | 100 | | | | |
| ACSM(S = 1.0) | 100 | | | | | |
| MgO | 5 | 5 | 5 | 5 | 5 | 5 |
| Processing aid | 2 | 2 | 2 | 2 | 2 | 2 |
| Carbon | 45 | 45 | 45 | 45 | 45 | 45 |
| Process oil | 10 | 10 | 10 | 10 | 10 | 10 |
| Antioxidant | 2 | 2 | 2 | 2 | 2 | 2 |
| Vulcanizing agent | 2 | 2 | 2 | 2 | 0.2 | 1 |
| Vulcanization accelerator | 1 | 1 | 1 | 1 | 1 | 1 |
| Pentaerythrite | 3 | 3 | 3 | 3 | 3 | 3 |
| tan δ | 0.083 | 0.092 | 0.099 | 0.103 | 0.120 | 0.119 |
| Belt life | 250 | 295 | 310 | 355 | 445 | 440 |

TABLE 1b

| | Embodiment | | | | | |
|---|---|---|---|---|---|---|
| | 7 | 8 | 9 | 10 | 11 | 12 |
| ACSM(S = 0.6) | | | | | | |
| ACSM(S = 0.7) | 100 | 100 | 100 | 100 | 100 | 100 |
| ACSM(S = 0.8) | | | | | | |
| ACSM(S = 1.0) | | | | | | |
| MgO | 5 | 5 | 5 | 5 | 5 | 5 |
| Processing aid | 2 | 2 | 2 | 2 | 2 | 2 |
| Carbon | 45 | 45 | 45 | 45 | 45 | 45 |
| Process oil | 10 | 10 | 10 | 10 | 10 | 10 |
| Antioxidant | 2 | 2 | 2 | 2 | 2 | 2 |
| Vulcanizing agent | 3 | 5 | 2 | 2 | 2 | 2 |
| Vulcanization accelerator | 1 | 1 | 0.1 | 3 | 4 | 1 |
| Pentaerythrite | 3 | 3 | 3 | 3 | 3 | 0.1 |
| tan δ | 0.093 | 0.084 | 0.120 | 0.093 | 0.088 | 0.135 |
| Belt life | 305 | 247 | 313 | 269 | 235 | 270 |

TABLE 1c

| | Embodiment | | | | | |
|---|---|---|---|---|---|---|
| | 13 | 14 | 15 | 16 | 17 | 18 |
| ACSM(S = 0.6) | | | | | | |
| ACSM(S = 0.7) | 100 | 100 | 100 | 100 | 100 | 100 |
| ACSM(S = 0.8) | | | | | | |
| ACSM(S = 1.0) | | | | | | |
| MgO | 5 | 5 | 5 | 5 | 5 | 5 |
| Processing aid | 2 | 2 | 2 | 2 | 2 | 2 |
| Carbon | 45 | 45 | 45 | 45 | 45 | 45 |
| Process oil | 10 | 10 | 10 | 10 | 10 | 10 |
| Antioxidant | 2 | 2 | 2 | 2 | 2 | 2 |
| Vulcanizing agent | 2 | 2 | 2 | 2 | 2 | 2 |
| Vulcanization accelerator | 1 | 1 | 1 | 1 | 3 | 5 |
| Pentaerythrite | 1 | 4 | 5 | 0 | 0 | 0 |
| tan δ | 0.129 | 0.096 | 0.083 | 0.141 | 0.097 | 0.080 |
| Belt life | 373 | 294 | 250 | 231* | 235 | 213 |

TABLE 1d

| | Comparative Example | | | |
|---|---|---|---|---|
| | 1 | 2 | 3 | 4 |
| ACSM(S = 0.6) | | 100 | | |
| ACSM(S = 0.7) | | | | |
| ACSM(S = 0.8) | | | | |
| ACSM(S = 1.0) | 100 | | 100 | 100 |
| MgO | 5 | 5 | 5 | 5 |
| Processing aid | 2 | 2 | 2 | 2 |
| Carbon | 45 | 45 | 45 | 45 |
| Process oil | 10 | 10 | 10 | 10 |
| Antioxidant | 2 | 2 | 2 | 2 |
| Vulcanizing agent | 6 | 2 | 2 | 2 |
| Vulcanization accelerator | 1 | 0 | 5 | 1 |
| Pentaerythrite | 3 | 3 | 3 | 6 |
| tan δ | 0.078 | 0.166 | 0.075 | 0.077 |
| Belt life | 176 | 116* | 164 | 167 |

In relation to the belt life of the above Table 1a to Table 1d, the values indicated with the mark "*" each mean the belt life due to limp (deformation) and the other values each mean the belt life due to production of a crack.

Effects of Sulfur Content

Comparison will be made below among Embodiments 1, 2, 3 and 4. These embodiments are different only in sulfur content of ACSM from each other. As the sulfur content is increased, the value of tan δ becomes smaller. As is evident from this, the sulfur content has an effect on the value of tan δ, that is, reduction in sulfur content provides an advantage in increasing the value of tan δ. The belt running lives of Embodiments 1 to 4 result from production of a crack. Accordingly, as the sulfur content is decreased, that is, as the value of tan δ is increased, production of such a crack can be restricted more effectively and the running life of the belt can be further increased.

Effect of Compounding Amount of Vulcanizing Agent

Embodiments 3, 5 to 8 and Comparative Example 1 are different only in compounding amount of vulcanizing agent from each other. As the compounding amount of vulcanizing agent is increased, the value of tan δ becomes smaller. As seen from this, the compounding amount of vulcanizing agent has an effect on the value of tan δ, more specifically, reduction in compounding amount of vulcanizing agent provides an advantage in increasing the value of tan δ.

However, when the compounding amount of vulcanizing agent is excessively small so that the value of tan δ becomes excessively large, the belt becomes limp.

Effect of Compounding Amount of Vulcanization Accelerator TRA

Embodiments 3, 9 to 11 and Comparative Examples 2 and 3 are different only in compounding amount of vulcanization accelerator from each other. As the compounding amount of vulcanization accelerator is increased, the value of tan δ becomes smaller. As seen from this, the compounding amount of vulcanization accelerator has an effect on the value of tan δ, more specifically, reduction in compounding amount of vulcanization accelerator provides an advantage in increasing the value of tan δ.

With regard to the belt running life, however, Comparative Example 2 is short, though it has a large value of tan δ. The reason for this is that Comparative Example 2 caused a defective power transmission due to limp. Accordingly, it can be understood that when the compounding amount of vulcanization accelerator is excessively small so that the value of tan δ becomes excessively large, this disadvantageously acts on the durability of the belt in terms of limp. In particular, as comparison is made between Embodiment 9 and Comparative Example 2, the former is different from the latter only in that a vulcanization accelerator is contained therein by 0.1 weight part. However, this causes a large difference between the values of tan δ of Embodiment 9 and Comparative Example 2. Embodiment 9 has a considerably longer belt running life as compared with Comparative Example 2.

Effect of Compounding Amount of Pentaerythrite

Embodiments 3, 12 to 16 and Comparative Example 4 are different only in compounding amount of pentaerythrite from each other. As the compounding amount of pentaerythrite is increased, the value of tan δ becomes smaller. As seen from this, the compounding amount of pentaerythrite has an effect on the value of tan δ, more specifically, reduction in compounding amount of pentaerythrite provides an advantage in increasing the value of tan δ.

In Embodiment 16, its compounding amount of pentaerythrite is zero thereby providing a large value of tan δ. With regard to the belt running life, however, Embodiment 16 is short because of a defective power transmission due to limp. Accordingly, it can be understood that when the compounding amount of pentaerythrite is excessively small so that the value of tan δ becomes excessively large, this disadvantageously acts on the durability of the belt in terms of limp. In particular, as comparison is made between Embodiment 12 and Embodiment 16, the former is different from the latter only in that a vulcanization accelerator is contained therein by 0.1 weight part. However, this causes a large difference between the values of belt lives of Embodiments 12 and 16.

The compounding amounts of pentaerythrite of Embodiments 17 and 18 are also zero as in Embodiment 16. In Embodiments 17 and 18, however, amounts of other compounding ingredients are adjusted so that the value of tan δ does not become excessively large. In spite of this, their belt lives are less increased.

Relationship between tan δ and Belt Running Life

Figure 4:
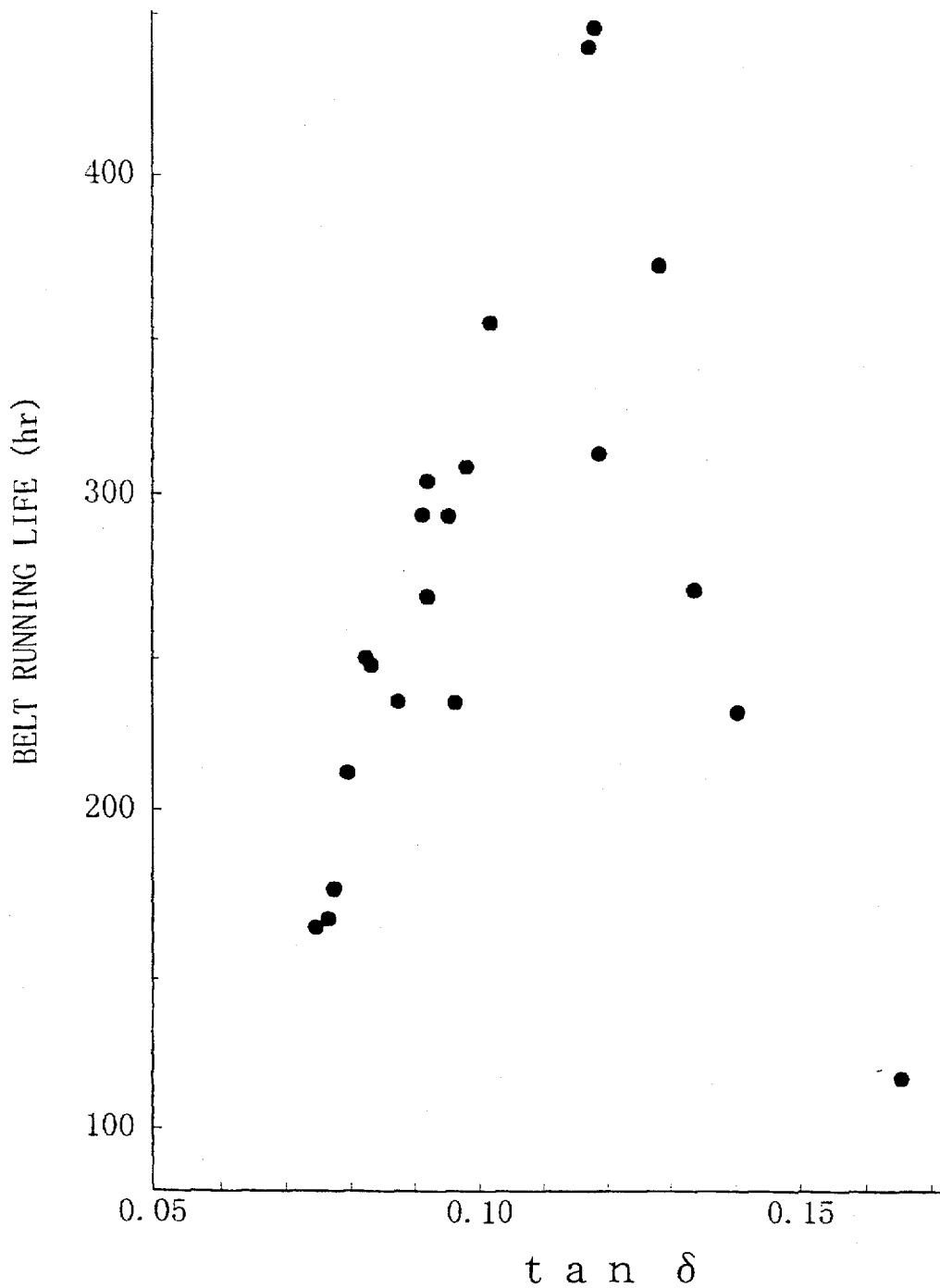
FIG. 4 is a graph showing a relationship between the running life and the value of tan δ of the power transmission belt without short fiber.

FIG. 4 shows a graph of a relationship between tan δ and the belt running life, which is made in accordance with respective Embodiments and Comparative Examples of Table 1a to Table 1d. As seen from FIG. 4, in order to increase the belt running life, the value of tan δ is preferably not less than 0.08, more preferably, not less than 0.09 and is preferably not more than 0.15.

What is claimed is:

1. A power transmission belt, characterized in that at least one of elements of the belt is made of a alkylated chlorosulfonated polyethylene composition in which a value of tan δ under conditions of a temperature of 100° C. and a frequency of 10 Hz is 0.08 to 0.15.

2. The power transmission belt according to claim 1, wherein a sulfur content of alkylated chlorosulfonated polyethylene is 0.6 to 1.2 weight %.

3. The power transmission belt according to claim 2, wherein the alkylated chlorosulfonated polyethylene composition is composed of alkylated chlorosulfonated polyethylene of 100 weight parts, N, N'-m-phenylene dimaleimide of 0.2 to 5.0 weight parts, dipentametylene thiuram tetrasulfide of 0.1 to 4.0 weight parts and pentaerythrite of 0.1 to 5.0 weight parts.

4. The power transmission belt according to claim 1, wherein the alkylated chlorosulfonated polyethylene composition is composed of alkylated chlorosulfonated polyethylene of 100 weight parts, N,N'-m-phenylene dimaleimide of 0.2 to 5.0 weight parts, dipentamethylene thiuram tetrasulfide of 0.1 to 4.0 weight parts and pentaerythrite of 0.1 to 5.0 weight parts.

5. A power transmission belt comprising an adhesion rubber layer which holds a cord extending in a longitudinal direction of the belt at a suitable position and a compression rubber layer, wherein at least a part of the compression rubber layer is formed of the alkylated chlorosulfonated polyethylene composition according to any one of claims 1 to 4.

6. The power transmission belt according to claim 5, wherein said power transmission belt is a raw edge V-belt.

7. The power transmission belt according to claim 5, wherein short fibers are mixed into the compression rubber layer.

8. The power transmission belt according to claim 7, wherein said power transmission belt is a raw edge V-ribbed belt.

* * * * *